US010192056B1

United States Patent
Goel et al.

(10) Patent No.: US 10,192,056 B1
(45) Date of Patent: Jan. 29, 2019

(54) SYSTEMS AND METHODS FOR AUTHENTICATING WHOLE DISK ENCRYPTION SYSTEMS

(71) Applicant: Symantec Corporation, Mountain View, CA (US)

(72) Inventors: Vipul Goel, Noida (IN); Hemant Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 245 days.

(21) Appl. No.: 15/369,913

(22) Filed: Dec. 6, 2016

(51) Int. Cl.
  *G06F 21/57* (2013.01)
  *H04L 29/06* (2006.01)
  *G06F 9/4401* (2018.01)
  *H04W 12/06* (2009.01)
  *H04L 9/08* (2006.01)

(52) U.S. Cl.
  CPC .......... *G06F 21/575* (2013.01); *G06F 9/4403* (2013.01); *H04L 9/083* (2013.01); *H04L 63/08* (2013.01); *H04W 12/06* (2013.01); *G06F 2221/2143* (2013.01)

(58) Field of Classification Search
  CPC .................................................. G06F 21/575
  See application file for complete search history.

(56) References Cited

U.S. PATENT DOCUMENTS

2010/0023782 A1* 1/2010 Prakash .............. G06F 21/6218
  713/193
2016/0191481 A1* 6/2016 Zimmer .............. H04L 63/0428
  713/168

OTHER PUBLICATIONS

YubiKey, by Yubico founded 2007: https://www.yubico.com/products/yubikey-hardware/; Nov. 11, 2012.
MacOS Sierra: Unlock your Mac with Apple Watch; Apple Auto Unlock, released with macOS Sierra Sep. 20, 2016: https://support.apple.com/kb/PH25156?locale=en_US; Sep. 20, 2016.

* cited by examiner

*Primary Examiner* — Albert Wang
(74) *Attorney, Agent, or Firm* — FisherBroyles, LLP (57) ABSTRACT

A computer-implemented method for authenticating whole disk encryption systems may include (i) detecting, by a computing device, an attempt to initiate a boot process on the computing device, (ii) verifying, by the computing device, an initial decryption key, (iii) decrypting, by the computing device, an initial set of software required to boot crucial functions of the computing device using the initial decryption key, (iv) detecting, by the computing device, a secondary device running an authentication application, (v) receiving, by the computing device, a second decryption key from the authentication application on the secondary device, and (vi) completing the boot process on the computing device based on a security policy associated with the second decryption key. Various other methods, systems, and computer-readable media are also disclosed.

20 Claims, 6 Drawing Sheets

SYSTEMS AND METHODS FOR AUTHENTICATING WHOLE DISK ENCRYPTION SYSTEMS

BACKGROUND

Whole disk encryption (WDE) fully encrypts all data and files on a computing device. Systems that enforce WDE typically provide enhanced benefits over standard encryption to protect the data on a computing device without requiring any action from users to encrypt specific files. However, when performing software-based WDE, crucial software such as the operating system may also be encrypted. This presents a problem during a boot process when such crucial software is needed in order to fully boot the computing device. For example, a user may not be able to log in to an account without first decrypting the encrypted operating system, which may then compromise the encryption of the remaining data.

Traditionally, bootloaders may use various pre-boot authentication methods to allow only a small portion of the data to be decrypted first. In this case, bootloaders may allow initial user access to the system without decrypting the remaining data. However, the bootloader itself may be targeted or compromised by a security attack. Furthermore, in some instances, the computing device may be physically compromised or stolen, which may present additional security challenges to both the bootloader and the remaining encrypted data on the computing device. The instant disclosure, therefore, identifies and addresses a need for improved systems and methods for authenticating whole disk encryption systems.

SUMMARY

As will be described in greater detail below, the instant disclosure describes various systems and methods for authenticating whole disk encryption systems. In one example, a computer-implemented method for authenticating whole disk encryption systems may include (i) detecting, by a computing device, an attempt to initiate a boot process on the computing device, (ii) verifying, by the computing device, an initial decryption key, (iii) decrypting, by the computing device, an initial set of software required to boot crucial functions of the computing device using the initial decryption key, (iv) detecting, by the computing device, a secondary device running an authentication application, (v) receiving, by the computing device, a second decryption key from the authentication application on the secondary device, and (vi) completing the boot process on the computing device based on a security policy associated with the second decryption key.

In some embodiments, the attempt to initiate the boot process may include an attempt to initialize a software program of the computing device and/or an attempt to turn on a hardware component of the computing device. Additionally or alternatively, the attempt to initiate the boot process may include an initiation of a bootloader.

In some examples, verifying the initial decryption key may include receiving the initial decryption key from a user of the computing device. In these examples, verifying the initial decryption key may also include determining that the initial decryption key is a valid key for the computing device.

In one embodiment, the initial set of software required to boot crucial functions may include files determined to be non-sensitive data. Additionally, the initial set of software may include software required to detect the secondary device.

In one example, detecting the secondary device running the authentication application may include detecting the secondary device connected to the computing device. Alternatively, detecting the secondary device may include searching for the secondary device using wireless technology and connecting to the secondary device using the wireless technology. Additionally, detecting the secondary device may include determining that the secondary device runs the authentication application.

In some embodiments, receiving the second decryption key may include requesting the second decryption key from the authentication application. Additionally, receiving the second decryption key may include receiving the second decryption key from the secondary device and/or receiving the second decryption key from a remote server.

In one example, completing the boot process on the computing device based on the security policy may include allowing user access to the computing device. In this example, allowing user access to the computing device may include verifying the second decryption key, completing decryption of data on the computing device using the initial decryption key and the second decryption key, and/or initiating a user login process. In other examples, completing the boot process on the computing device may include preventing user access to the computing device. In these examples, preventing user access to the computing device may include formatting a disk of the computing device, deleting data on the computing device, rejecting a user login, and/or alerting an administrator about the attempt to initiate the boot process.

In one embodiment, a system for implementing the above-described method may include a variety of modules, stored in memory, including (i) a boot module that detects, by a computing device, an attempt to initiate a boot process on the computing device, (ii) a verification module that verifies, by the computing device, an initial decryption key, (iii) a decryption module that decrypts, by the computing device, an initial set of software required to boot crucial functions of the computing device using the initial decryption key, (iv) a detection module that detects, by the computing device, a secondary device running an authentication application, (v) a reception module that receives, by the computing device, a second decryption key from the authentication application on the secondary device, and (vi) a completion module that completes the boot process on the computing device based on a security policy associated with the second decryption key. In addition, the system may include at least one processor that executes the boot module, the verification module, the decryption module, the detection module, the reception module, and the completion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an attempt to initiate a boot process on the computing device, (ii) verify an initial decryption key, (iii) decrypt an initial set of software required to boot crucial functions of the computing device using the initial decryption key, (iv) detect a secondary device running an authentication application, (v) receive a second decryption key from the authentication application on the secondary device, and (vi) complete the boot process on the computing device based on a security policy associated with the second decryption key.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for authenticating whole disk encryption systems. As used herein, the term "whole disk encryption," also known as "full disk encryption," generally refers to a method to protect and encrypt all of the data on a computing device. As will be explained in greater detail below, by implementing two-factor authentication with a secondary computing device, the systems and methods described herein may improve the security of a whole disk encryption system. For example, by requiring a second key from the secondary device, the disclosed systems and methods may add a level of authentication against physical attacks to the computing device. Furthermore, by enforcing a security policy through the transmission of the second key, the disclosed systems and methods may increase resilience against social engineering attacks or insecure practices.

In addition, the systems and methods described herein may improve the functioning of a computing device by allowing decryption of initial boot software separately from decryption of sensitive data. These systems and methods may also improve the fields of cybersecurity and/or information security by remotely enforcing security policies without requiring online access to the computing device.

Figure 1:
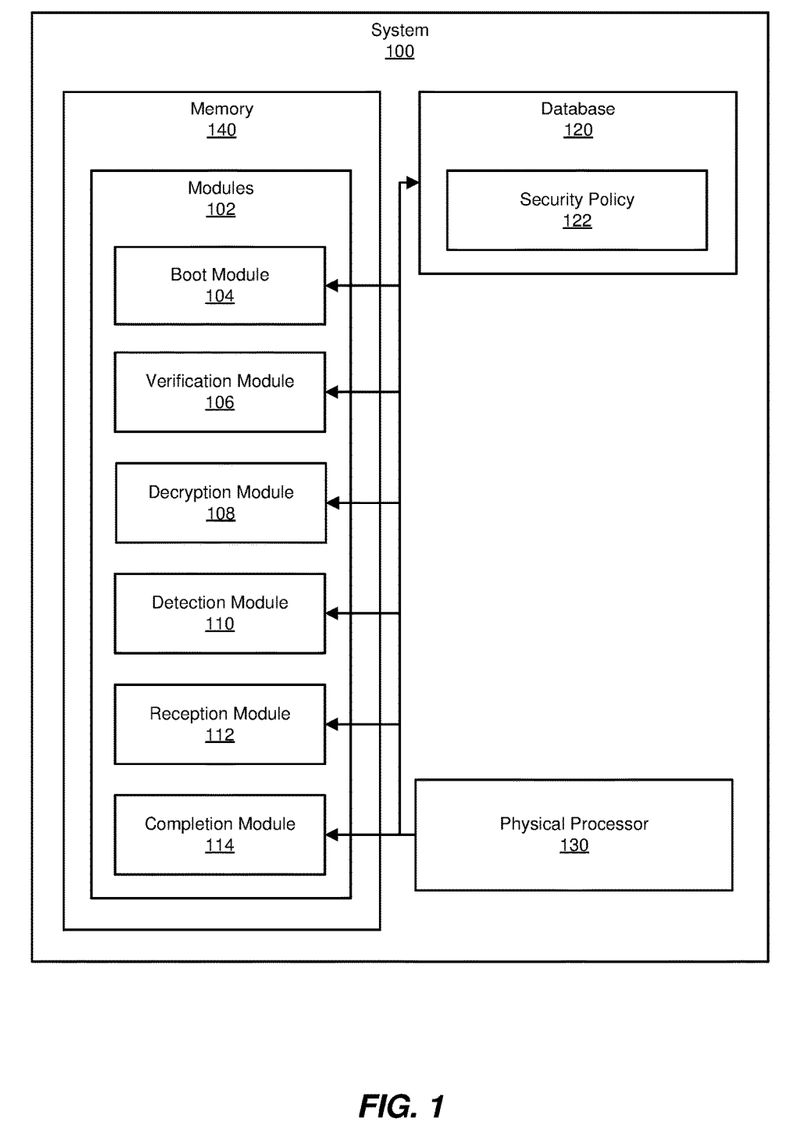
FIG. 1 is a block diagram of an example system for authenticating whole disk encryption systems.
Figure 2:
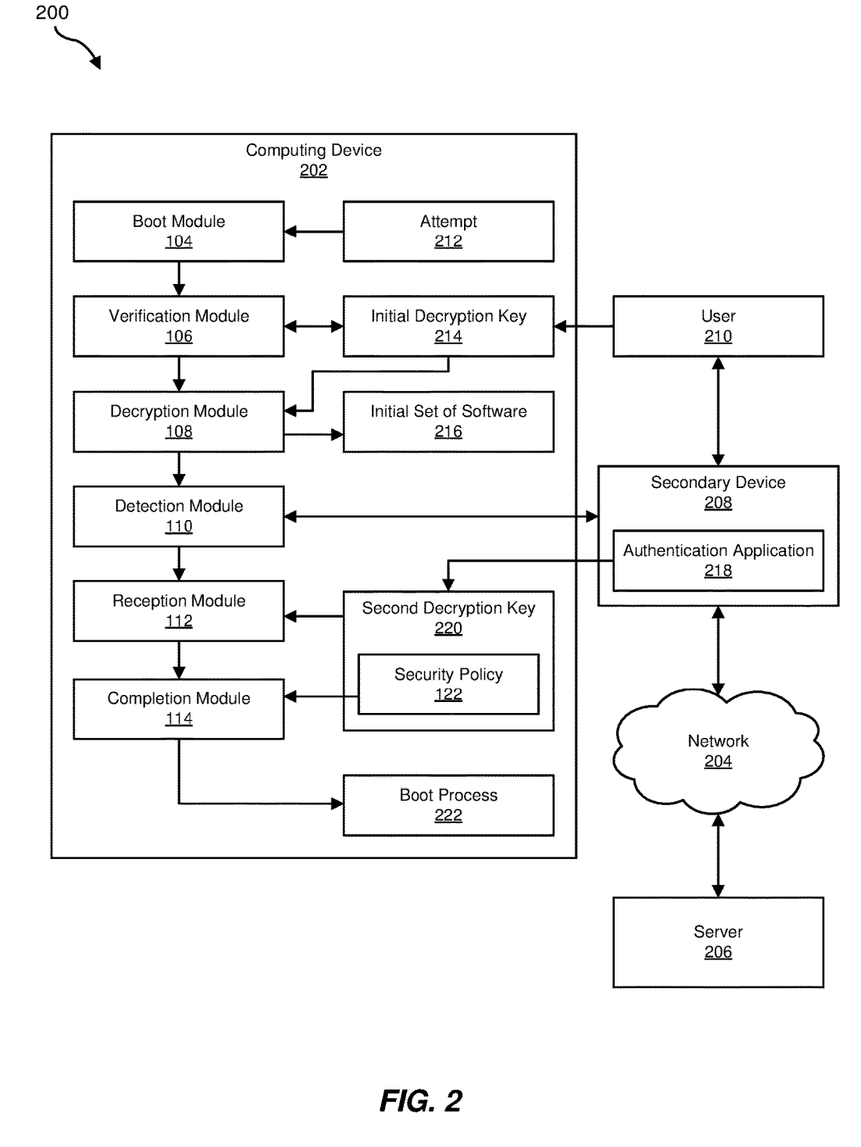
FIG. 2 is a block diagram of an additional example system for authenticating whole disk encryption systems.

The following will provide, with reference to FIGS. 1 and 2, detailed descriptions of example systems for authenticating whole disk encryption systems. Detailed descriptions of corresponding computer-implemented methods will also be provided in connection with FIG. 3. In addition, detailed descriptions of an example server containing example security policies will be provided in connection with FIG. 4. Furthermore, detailed descriptions of an example computing system and network architecture capable of implementing one or more of the embodiments described herein will be provided in connection with FIGS. 5 and 6, respectively.

FIG. 1 is a block diagram of example system 100 for authenticating whole disk encryption systems. As illustrated in this figure, system 100 may include one or more modules 102 for performing one or more tasks. For example, and as will be explained in greater detail below, modules 102 may include a boot module 104 that detects, by a computing device, an attempt to initiate a boot process on the computing device. The terms "boot" and "boot process," as used herein, generally refer to an action or series of actions that initializes a computing system or computing environment. Modules 102 may additionally include a verification module 106 that verifies, by the computing device, an initial decryption key. The term "decryption key," as used herein, generally refers to a piece of data or code that deciphers a cryptographic algorithm or transforms other encrypted data.

Modules 102 may also include a decryption module 108 that decrypts, by the computing device, an initial set of software required to boot crucial functions of the computing device using the initial decryption key. Modules 102 may further include a detection module 110 that detects, by the computing device, a secondary device running an authentication application. The term "authentication application," as used herein, generally refers to a software program that provides functions to obtain, verify, and/or transmit authentication information.

Modules 102 may additionally include a reception module 112 that receives, by the computing device, a second decryption key from the authentication application on the secondary device. Furthermore, modules 102 may include a completion module 114 that completes the boot process on the computing device based on a security policy associated with the second decryption key. The term "security policy," as used herein, generally refers to a rule or set of rules for managing data, particularly encrypted data, and resources on a computing device. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or secondary device 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate authenticating whole disk encryption systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a security policy 122, which may include a rule for managing data on computing devices. Database 120 may represent portions of a single database or computing device or a plurality of databases or computing devices. For example, database 120 may represent a portion of computing device 202, server 206, and/or secondary device 208 in FIG. 2. Alternatively, database 120 in FIG. 1 may represent one or more physically separate devices capable of being accessed by a computing device, such as computing device 202, server 206, and/or secondary device 208 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a secondary device 208 and secondary device 208 in communication with a server 206 via a network 204. Alternatively, computing device 202, server 206, and secondary device 208 may all be in communication via network 204. In one example, all or a portion of the functionality of modules 102 may be performed by computing device 202, server 206, secondary device 208, and/or any other suitable computing system. Similarly, parts of secondary device 208, server 206, and/or computing device 202 may be merged into a single machine or computing system such that the functionality of each of modules 102 is provided within a single device.

As will be described in greater detail below, one or more of modules 102 from FIG. 1 may, when executed by at least one processor of computing device 202, server 206, and/or secondary device 208, enable computing device 202, server 206, and/or secondary device 208 to perform authentication and data decryption for computing device 202. For example, and as will be described in greater detail below, boot module 104 may detect an attempt 212 to initiate a boot process 222 on computing device 202. Verification module 106 may verify an initial decryption key 214. Decryption module 108 may decrypt an initial set of software 216 required to boot crucial functions of computing device 202 using initial decryption key 214. Detection module 110 may detect secondary device 208 running an authentication application 218. Reception module 112 may receive a second decryption key 220 from authentication application 218 on secondary device 208. Completion module 114 may complete boot process 222 on computing device 202 based on security policy 122 associated with second decryption key 220.

In the example of FIG. 2, and as will be explained in greater detail below, computing device 202 may first detect attempt 212 to boot computing device 202. Computing device 202 may then receive initial decryption key 214 from a user 210 of computing device 202 and verify initial decryption key 214. Computing device 202 may also decrypt initial set of software 216 using initial decryption key 214. Next, computing device 202 may detect secondary device 208 with authentication application 218, which may obtain second decryption key 220 from server 206 via network 204. Computing device 202 may then receive second decryption key 220 containing security policy 122 from authentication application 218. Finally, computing device 202 may complete boot process 222 based on security policy 122.

Computing device 202 and/or secondary device 208 generally represent any type or form of computing device capable of reading computer-executable instructions. For example, computing device 202 may represent an endpoint device running WDE software, and secondary device 208 may represent a mobile device capable of interfacing with computing device 202. Additional examples of computing device 202 and/or secondary device 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Server 206 generally represents any type or form of computing device that is capable of storing, transmitting, and/or managing decryption keys and/or security policies. For example, server 206 may represent a policy server that analyzes a computing environment's security and selects appropriate decryption keys and/or security policies based on an organization's rules for its devices. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between server 206 and secondary device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
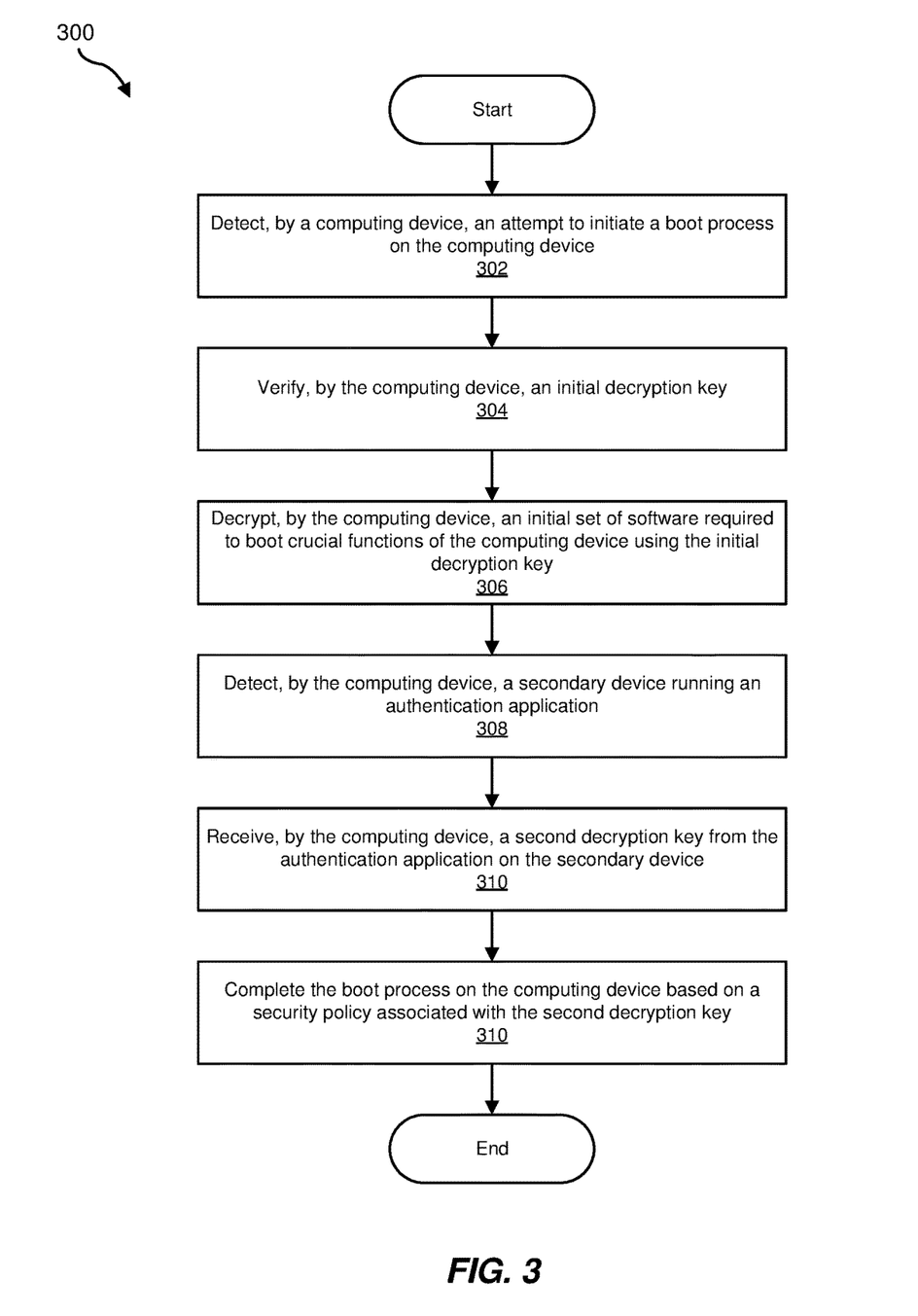
FIG. 3 is a flow diagram of an example method for authenticating whole disk encryption systems.

FIG. 3 is a flow diagram of an example computer-implemented method 300 for authenticating whole disk encryption systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, by a computing device, an attempt to initiate a boot process on the computing device. For example, boot module 104 may, as part of computing device 202 in FIG. 2, detect attempt 212 to initiate boot process 222 on computing device 202.

Boot module 104 may detect attempt 212 in a variety of ways. In one embodiment, attempt 212 to initiate boot process 222 may include an attempt to initialize a software program of computing device 202 and/or an attempt to turn on a hardware component of computing device 202. For example, attempt 212 may include an attempt to initialize an operating system of computing device 202. Alternatively, attempt 212 may include a physical push of a button to turn on power to computing device 202. In additional embodiments, attempt 212 may include an initiation of a bootloader. The term "bootloader," as used herein, generally refers to a software program to manage and/or load an operating system and other data to RAM during startup. Notably, a bootloader may initialize prior to the initialization of other software on a computing device.

Returning to FIG. 3, at step 304, one or more of the systems described herein may verify, by the computing device, an initial decryption key. For example, verification module 106 may, as part of computing device 202 in FIG. 2, verify initial decryption key 214.

Verification module 106 may verify initial decryption key 214 in a variety of ways. In some examples, verification module 106 may verify initial decryption key 214 by receiving initial decryption key 214 from a user of computing device 202, such as user 210. For example, as part of attempt 212 to boot computing device 202, user 210 may enter initial decryption key 214 to computing device 202. In this example, initial decryption key 214 may include a string of characters, such as a password, entered via a keyboard or other input device. Initial decryption key 214 may alternatively be transmitted by a peripheral device, such as a memory card or flash drive. In other examples, verification module 106 may prompt user 210 for initial decryption key 214 after detecting attempt 212.

In the above examples, verification module 106 may then determine that initial decryption key 214 is a valid key for computing device 202. For example, verification module 106 may compare initial decryption key 214 against a known list of valid decryption keys. Alternatively, verification module 106 may directly attempt to decrypt part or all of initial set of software 216 with initial decryption key 214 and, subsequently, determine that initial decryption key 214 is able to decrypt initial set of software 216. In other examples, verification module 106 may also verify that a structure or format of initial decryption key 214 is valid for computing device 202.

Returning to FIG. 3, at step 306, one or more of the systems described herein may decrypt, by the computing device, an initial set of software required to boot crucial functions of the computing device using the initial decryption key. For example, decryption module 108 may, as part of computing device 202 in FIG. 2, decrypt initial set of software 216 required to boot crucial functions of computing device 202 using initial decryption key 214.

Decryption module 108 may decrypt initial set of software 216 in a variety of ways. In some embodiments, initial set of software 216 required to boot crucial functions may include files determined to be non-sensitive data. In these embodiments, the non-sensitive data may include files that have been predetermined to contain no sensitive information and/or files that do not compromise other data or computing device 202. Furthermore, the non-sensitive data may include files that boot a portion of computing device 202 without affecting other sensitive data on computing device 202. The sensitive data on computing device 202 may require additional authentication, such as second decryption key 220, and decryption module 108 may not be able to decrypt the sensitive data with only initial decryption key 214.

In other embodiments, initial set of software 216 may also include software required to detect secondary device 208. For example, initial set of software 216 may include software that allows computing device 202 to connect to secondary device 208 via a wireless channel, such as BLUETOOTH, and/or via a hardware connection, such as a Universal Serial Bus port. In these embodiments, the software required to detect secondary device 208 may be predetermined to contain non-sensitive data or prevent access to sensitive data. For example, to prevent security breaches over the Internet, decryption module 108 may only decrypt software that does not allow access to a wireless LAN, such as network 204, while allowing detection of secondary device 208 over a different wireless network without Internet connection. Computing device 202 may be preconfigured to limit the types of software included in initial set of software 216 based on a security policy or administrative rule.

Returning to FIG. 3, at step 308, one or more of the systems described herein may detect, by the computing device, a secondary device running an authentication application. For example, detection module 110 may, as part of computing device 202 in FIG. 2, detect secondary device 208 running authentication application 218.

Detection module 110 may detect secondary device 208 in a variety of ways. In one example, detection module 110 may detect secondary device 208 by detecting secondary device connected to computing device 202. In this example, secondary device 208 may be physically connected to computing device 202 by hardware. In another example, detection module 110 may detect secondary device 208 by searching for secondary device 208 using wireless technology and connecting to secondary device 208 using the wireless technology. Examples of the wireless technology may include, without limitation, BLUETOOTH, Wi-Fi, LAN, near-field communication (NFC), connection to network 204, or any other suitable wireless connection.

Furthermore, in the above examples, detection module 110 may determine that secondary device 208 runs authentication application 218. For example, detection module 110 may only allow connections from devices that run authentication application 218. Alternatively, detection module 110 may first connect to secondary device 208 and then search for authentication application 218 on secondary device 208. Authentication application 218 may also broadcast a specific signal, and detection module 110 may detect the signal and recognize the signal as authentication application 218.

Returning to FIG. 3, at step 310, one or more of the systems described herein may receive, by the computing device, a second decryption key from the authentication application on the secondary device. For example, reception module 112 may, as part of computing device 202 in FIG. 2, receive second decryption key 220 from authentication application 218 on secondary device 208.

Reception module 112 may receive second decryption key 220 in a variety of ways. In one embodiment, reception module 112 may receive second decryption key 220 by first requesting second decryption key 220 from authentication application 218. Reception module 112 may then receive second decryption key 220 from secondary device 208. In this embodiment, authentication application 218 may prompt user 210 to enter additional authentication information on secondary device 208 in order to obtain second decryption key 220 from server 206. For example, user 210 may swipe a fingerprint scanner, which may verify an identity of user 210, and authentication application 218 may then request second decryption key 220 from server 206 via network 204. As another example, secondary device 208 may be a mobile phone, and authentication application 218 may request second decryption key 220 via text message. Authentication application 218 may then transmit second decryption key 220 to computing device 202.

Alternatively, reception module 112 may receive second decryption key 220 directly from a remote server, such as server 206. In this embodiment, computing device 202 may be connected to server 206 via network 204, and authentication application 218 may direct server 206 to transmit second decryption key 220 to computing device 202. Furthermore, in some embodiments, second decryption key 220 may be temporarily stored on secondary device 208, and authentication application 218 may verify user 210 and transmit second decryption key 220 to computing device 202 without server 206. In these embodiments, second decryption key 220 may be stored on secondary device 208 in an encrypted format to prevent compromise due to an attack on secondary device 208.

In some examples, second decryption key 220 on server 206 may also be encrypted for transmission to devices. A common key may be shared between devices within an organization, such as between computing device 202 and server 206 and/or secondary device 208. For example, initial set of software 216 on computing device 202 may contain a private key capable of decrypting second decryption key 220 and security policy 122. Reception module 112 may then use the private key to decrypt second decryption key 220 after receiving second decryption key 220 from server 206, which may distribute keys to multiple computing devices.

Returning to FIG. 3, at step 312, one or more of the systems described herein may complete the boot process on the computing device based on a security policy associated with the second decryption key. For example, completion module 114 may, as part of computing device 202 in FIG. 2, complete boot process 222 on computing device 202 based on security policy 122 associated with second decryption key 220.

Completion module 114 may complete boot process 222 in a variety of ways. In some examples, security policy 122 may be embedded and/or hidden in second decryption key 220. For example, second decryption key 220 may contain a string of characters that, when decrypted and read by computing device 202, instructs computing device 202 to follow security policy 122. In the example of FIG. 2, server 206 may determine appropriate security policies based on the verification of user 210 by secondary device 208. For example, authentication application 218 may determine that user 210 is unauthorized to access computing device 202 based on an invalid fingerprint, and server 206 may send second decryption key 220 with security policy 122 that heightens security on computing device 202. Security policy 122 may be selected based on an assessment of risk and/or a predefined sequence of events and embedded within second decryption key 220 to prevent detection by user 210. Alternatively, computing device 202 may include security policy 122, and second decryption key 220 may dictate which security policy to enact.

In some embodiments, completion module 114 may allow user access to computing device 202. In these embodiments, completion module 114 may verify second decryption key 220, complete decryption of data on computing device 202 using initial decryption key 214 and second decryption key 220, and/or initiate a user login process. In the above example, if the fingerprint of user 210 is verified, security policy 122 may allow full booting of computing device 202, and user 210 may proceed to the user login process. Completion module 114 may decrypt the remaining data on computing device 202 with a combination of initial decryption key 214 and second decryption key 220. In this example, both keys may be required for full decryption.

In alternate embodiments, completion module 114 may prevent user access to computing device 202. In these embodiments, completion module 114 may format a disk of computing device 202, delete data on computing device 202, reject a user login, and/or alert an administrator about attempt 212 to initiate boot process 222. For example, after determining user 210 is unauthorized to access computing device 202, server 206 may select security policy 122 to prevent breaches to an organization's data by deleting such data on computing device 202. Computing device 202 may then automatically enact security policy 122 and prevent user 210 from accessing the sensitive data. In these embodiments, user 210 may not have foreknowledge of and/or may not be able to prevent the execution of security policy 122.

Figure 4:
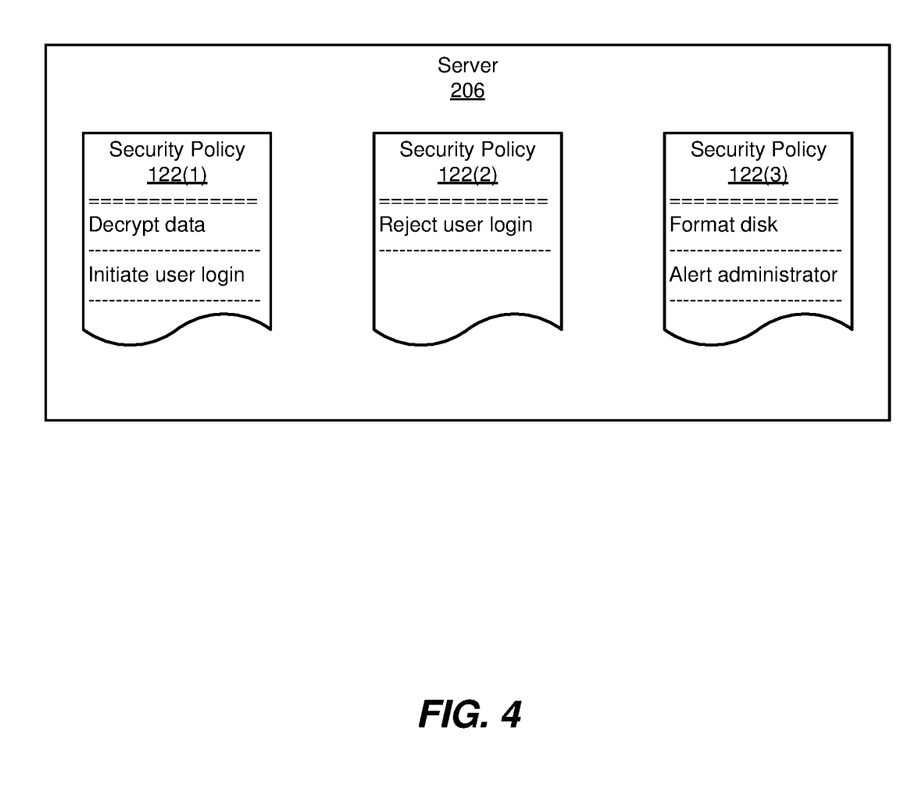
FIG. 4 is a block diagram of an example server containing example security policies.

As illustrated in FIG. 4, server 206 may include a security policy 122(1), a security policy 122(2), and a security policy 122(3). Server 206 may transmit security policy 122(1) with second decryption key 220 for verified users in order to allow full access to computing device 202. Server 206 may transmit security policy 122(2) for unverified users posing a mild security risk. For example, user 210 may incorrectly scan a fingerprint, and security policy 122(2) may reject a first user login but allow user 210 to attempt to verify user identity again. Server 206 may transmit security policy 122(3) for unverified users posing a high security risk, such as a suspected attacker. In this example, computing device 202 may format a memory disk to hide or block access to sensitive data and alert an administrator about the high security risk. Server 206 and/or authentication application 218 may select a security policy based on a detected level of threat or other security factors.

As explained above in connection with method 300 in FIG. 3, the disclosed systems and methods may, by implementing a form of policy-based authentication for a bootloader, improve security for whole disk encryption systems. Specifically, the disclosed systems and methods may require both an initial decryption key and a second decryption key from a secondary device to fully decrypt data and boot a computing device. By requiring the second decryption key from a separate device, the systems and methods described herein may prevent a breach of sensitive data due to unauthorized physical access to the computing device.

By embedding a security policy in the second decryption key, the disclosed systems and methods may then enforce data management rules, such as organizational policies, on the computing device without interference from an attacker. In some examples, the systems and methods described herein may also use the secondary device to provide another layer of authentication without requiring the computing device to maintain an online connection to a policy server.

As detailed above, by including a security policy with an authentication key transmitted by an external device, the disclosed systems and methods may more easily enforce rules to manage encrypted data on computing devices, either online or offline. Furthermore, by preventing access to sensitive data and user login without two separate keys, the disclosed systems and methods may provide better protection against physical and social engineering attacks. Thus, the systems and methods described herein may improve the security of remote devices that use whole disk encryption.

Figure 5:
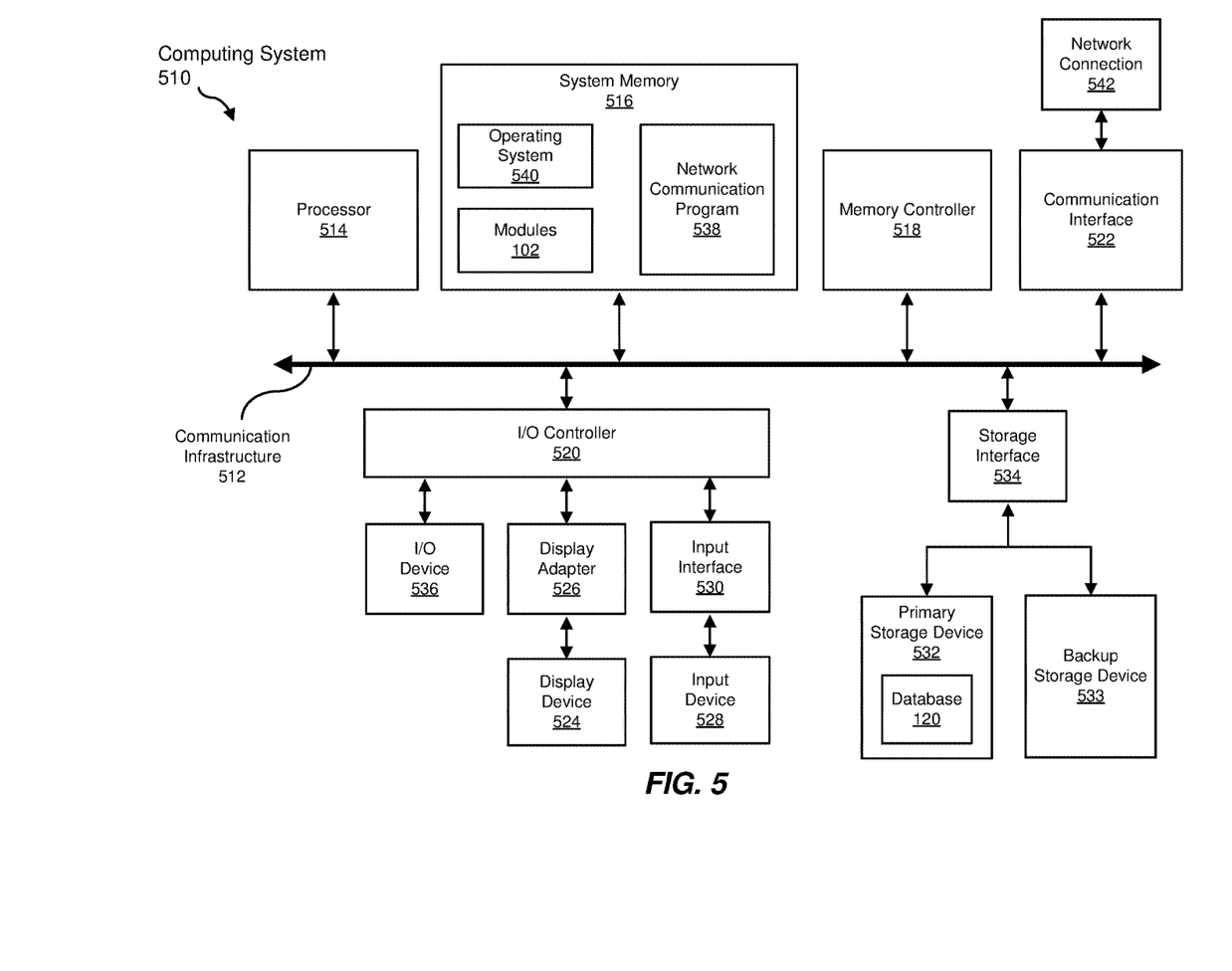
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application-Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an ASIC adapted to implement one or more of the example embodiments disclosed herein.

Figure 6:
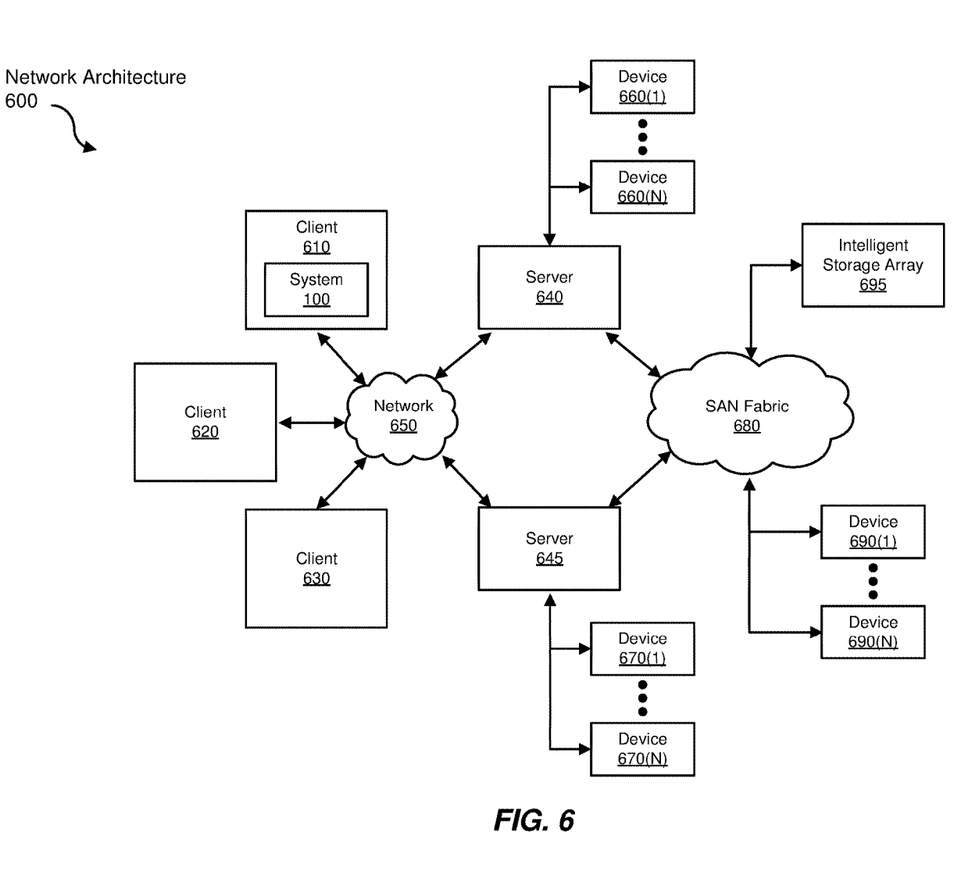
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for authenticating whole disk encryption systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a security policy to be transformed, transform the security policy, output a result of the transformation to a storage or output device, use the result of the transformation to manage encrypted data, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating whole disk encryption systems, at least a portion of the method being performed by a computing device comprising at least one processor, the method comprising:
    detecting, by the computing device, an attempt to initiate a boot process on the computing device;
    verifying, by the computing device, an initial decryption key;
    decrypting, by the computing device, an initial set of software required to boot crucial functions of the computing device using the initial decryption key;
    detecting, by the computing device, a secondary device running an authentication application;
    receiving, by the computing device, a second decryption key from the authentication application on the secondary device; and
    completing the boot process on the computing device based on a security policy associated with the second decryption key.

2. The method of claim 1, wherein the attempt to initiate the boot process comprises at least one of:
    an attempt to initialize a software program of the computing device;

an attempt to turn on a hardware component of the computing device; and an initiation of a bootloader.

3. The method of claim 1, wherein verifying the initial decryption key comprises:

receiving the initial decryption key from a user of the computing device; and determining that the initial decryption key is a valid key for the computing device.

4. The method of claim 1, wherein the initial set of software required to boot crucial functions comprises:

files determined to be non-sensitive data; and software required to detect the secondary device.

5. The method of claim 1, wherein detecting the secondary device running the authentication application comprises at least one of:

detecting the secondary device connected to the computing device;

searching for the secondary device using wireless technology;

connecting to the secondary device using the wireless technology; and determining that the secondary device runs the authentication application.

6. The method of claim 1, wherein receiving the second decryption key comprises at least one of:

requesting the second decryption key from the authentication application;

receiving the second decryption key from the secondary device; and receiving the second decryption key from a remote server.

7. The method of claim 1, wherein completing the boot process on the computing device based on the security policy comprises at least one of:

allowing user access to the computing device; and preventing user access to the computing device.

8. The method of claim 7, wherein allowing user access to the computing device comprises at least one of:

verifying the second decryption key;

completing decryption of data on the computing device using the initial decryption key and the second decryption key; and initiating a user login process.

9. The method of claim 7, wherein preventing user access to the computing device comprises at least one of:

formatting a disk of the computing device;

deleting data on the computing device;

rejecting a user login; and alerting an administrator about the attempt to initiate the boot process.

10. A system for authenticating whole disk encryption systems, the system comprising:

a boot module, stored in memory, that detects, by a computing device, an attempt to initiate a boot process on the computing device;

a verification module, stored in memory, that verifies, by the computing device, an initial decryption key;

a decryption module, stored in memory, that decrypts, by the computing device, an initial set of software required to boot crucial functions of the computing device using the initial decryption key;

a detection module, stored in memory, that detects, by the computing device, a secondary device running an authentication application;

a reception module, stored in memory, that receives, by the computing device, a second decryption key from the authentication application on the secondary device;

a completion module, stored in memory, that completes the boot process on the computing device based on a security policy associated with the second decryption key; and at least one processor that executes the boot module, the verification module, the decryption module, the detection module, the reception module, and the completion module.

11. The system of claim 10, wherein the attempt to initiate the boot process comprises at least one of:

an attempt to initialize a software program of the computing device;

an attempt to turn on a hardware component of the computing device; and an initiation of a bootloader.

12. The system of claim 10, wherein the verification module verifies the initial decryption key by:

receiving the initial decryption key from a user of the computing device; and determining that the initial decryption key is a valid key for the computing device.

13. The system of claim 10, wherein the initial set of software required to boot crucial functions comprises:

files determined to be non-sensitive data; and software required to detect the secondary device.

14. The system of claim 10, wherein the detection module detects the secondary device running the authentication application by at least one of:

detecting the secondary device connected to the computing device;

searching for the secondary device using wireless technology;

connecting to the secondary device using the wireless technology; and determining that the secondary device runs the authentication application.

15. The system of claim 10, wherein the reception module receives the second decryption key by at least one of:

requesting the second decryption key from the authentication application;

receiving the second decryption key from the secondary device; and receiving the second decryption key from a remote server.

16. The system of claim 10, wherein the completion module completes the boot process on the computing device based on the security policy by at least one of:

allowing user access to the computing device; and preventing user access to the computing device.

17. The system of claim 16, wherein allowing user access to the computing device comprises at least one of:

verifying the second decryption key;

completing decryption of data on the computing device using the initial decryption key and the second decryption key; and initiating a user login process.

18. The system of claim 16, wherein preventing user access to the computing device comprises at least one of:

formatting a disk of the computing device;

deleting data on the computing device;

rejecting a user login; and alerting an administrator about the attempt to initiate the boot process.

19. A non-transitory computer-readable medium comprising one or more computer-executable instructions that, when executed by at least one processor of a computing device, cause the computing device to:

detect, by the computing device, an attempt to initiate a boot process on the computing device;

verify, by the computing device, an initial decryption key;

decrypt, by the computing device, an initial set of software required to boot crucial functions of the computing device using the initial decryption key;

detect, by the computing device, a secondary device running an authentication application;

receive, by the computing device, a second decryption key from the authentication application on the secondary device; and complete the boot process on the computing device based on a security policy associated with the second decryption key.

20. The non-transitory computer-readable medium of claim 19, wherein the attempt to initiate the boot process comprises at least one of:

an attempt to initialize a software program of the computing device;

an attempt to turn on a hardware component of the computing device; and an initiation of a bootloader.

\* \* \* \* \*